No. 793,896. PATENTED JULY 4, 1905.
A. J. MUNDY.
SUBMARINE SIGNAL.
APPLICATION FILED FEB. 14, 1903.

Witnesses.

Inventor.
Arthur J. Mundy
per
Attorney.

No. 793,896. PATENTED JULY 4, 1905.
A. J. MUNDY.
SUBMARINE SIGNAL.
APPLICATION FILED FEB. 14, 1903.

Witnesses.
J. M. Dolan
Paul Lippustein

Inventor
Arthur J. Mundy
per
Attorney

No. 793,896. Patented July 4, 1905.

UNITED STATES PATENT OFFICE.

ARTHUR J. MUNDY, OF BOSTON, MASSACHUSETTS, ASSIGNOR TO SUBMARINE SIGNAL COMPANY OF WATERVILLE, MAINE, OF BOSTON, MASSACHUSETTS, A CORPORATION OF MAINE.

SUBMARINE SIGNAL.

SPECIFICATION forming part of Letters Patent No. 793,896, dated July 4, 1905.

Application filed February 14, 1903. Serial No. 143,396.

*To all whom it may concern:*

Be it known that I, ARTHUR J. MUNDY, a citizen of the United States, and a resident of Boston, in the county of Suffolk and State of Massachusetts, have invented a new and useful Improvement in Submarine Signaling, of which the following is a full, clear, and exact description, reference being had to the accompanying drawings, forming a part of this specification, in explaining its nature.

The invention relates to that portion of a submarine signaling system which includes the means for taking the sound-signals conducted by the water from a submerged signaling apparatus from the water and transmitting them, preferably electrically, to a telephone-receiver on a vessel. This portion of the apparatus as a whole I have named a "hydrophone." The part of the hydrophone which is immersed in the water and receives sound impulses from it and transmits them I term the "hydrophone-transmitter," or, for short, the "transmitter." The part which receives the impulses from the transmitter and delivers the sound to the hearer I call the "hydrophone-receiver," or, for short, the "receiver."

For use on sailing vessels the sound transmitters and receivers which are described in various of my applications for Letters Patent of the United States will answer very well. For use on vessels carrying machinery making noise—like, for instance, steamships—I have discovered that it is desirable to take and transmit the sound-signals conducted by the water from the water at a point away from the vessel and below the surface of the water and also while the vessel is in motion; and my present invention or hydrophone comprises a device the sound-transmitting portion of which is adapted to be let into the water from the stern of a moving vessel and to be towed in the water by the vessel at any desired distance therefrom and at any required depth below the surface of the water and the receiver portion of which is adapted to be carried on the vessel and to receive from the submerged sound-transmitter the sound-signals conducted to it by the water and to deliver them audibly to the hearer on the vessel. I prefer to employ as a means for holding the hydrophone-transmitter submerged a transmitter-holder, which has a shape resembling that of a fish, which holder is provided with means whereby, while being towed, it is caused to assume an upright or vertical position below the surface of the water in the water and to maintain such position so long as it may be towed or be in motion. The transmitter preferably is so mounted in the holder as to present a sound-receiving diaphragm on each side of the holder, which preferably is flush with said side. The tow-line for towing the holder in its submerged plane also serves to provide an electric circuit between the transmitter and battery on the vessel and the receiver. It is of peculiar construction, as will hereinafter appear. The holder preferably is attached to the tow-line by means which may form a part of the tow-line, which acts to prevent sound-vibrations from being delivered by the tow-line to the transmitter of the holder and which sound-insulating means I have termed an "antihummer." The electric relation between the transmitter and the battery on the vessel is such that the electric circuit from the transmitter to the battery and receiver is automatically established upon the submerging of the holder, remains established while it is submerged, is automatically broken upon the removal of the holder from the water, and remains broken while it is so removed from the water and inactive. A means which I have shown for accomplishing this result is the employment as a part of the circuit of the water itself when the holder is submerged; but I do not confine myself to this method of automatically making and breaking the circuit.

The invention also includes couplings for connecting the holder with the antihummer and the antihummer with the tow-line, also details of construction which will hereinafter be fully described.

I will now describe the invention in conjunction with the drawings forming a part of this specification, wherein—

Fig. 5 is a view, enlarged, principally in horizontal section to illustrate the transmitter, the manner of mounting it in the holder, and of electrically connecting it. Fig. 6 is a view in elevation, enlarged, of one side of the transmitter, a diaphragm and spring carried by it being removed. Figs. 7 and 8 are views of the diaphragm-springs hereinafter referred to.

In the drawings, A represents the holder; B, the antihummer; C, the tow-line; D, the transmitter in the holder; E, the holder-coupling which connects the holder with the antihummer, and F the coupling which connects the antihummer with the tow-line.

Figures 2, 3, 4:
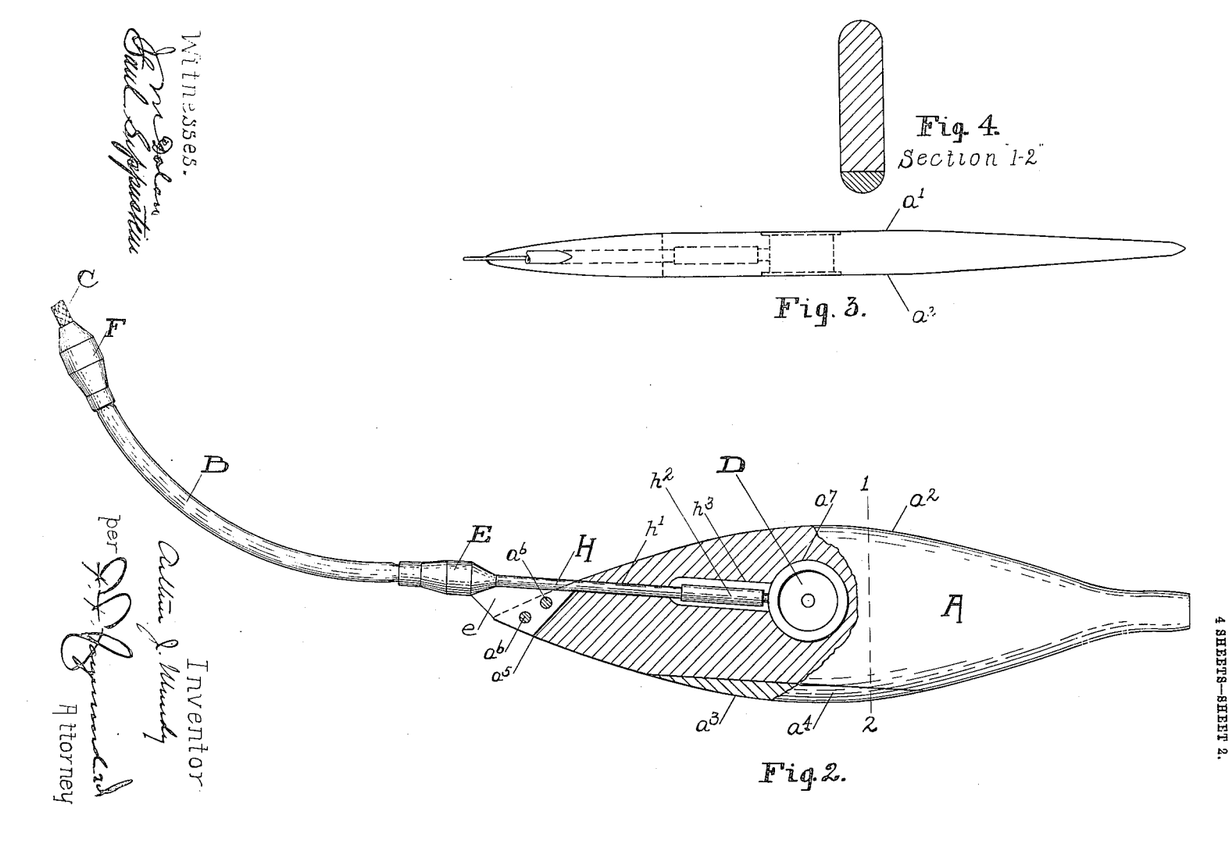
Fig. 2 is a view in elevation of the transmitter, holder, antihummer, and lower end of the tow-line, a portion of the holder being broken out to show the connection of the transmitter and holder with the antihummer.
Fig. 3 is a partial view in plan of the holder.
Fig. 4 is a view in vertical section of the holder upon the dotted line 1 2 of Fig. 2.

The holder A preferably is in the main made of wood and in the shape of a fish, resembling a salmon. Its body has straight parallel sides $a\ a'$, which taper gradually toward each end of the holder, and the top $a^2$ and bottom $a^3$ of the holder from end to end are preferably inclined from the middle, as shown. The holder also has a lead keel $a^4$ fastened to it for maintaining it upright in the water. Its member of the coupling E is arranged to extend from a point somewhat above its forward end and so that the holder shall be inclined downward at a right angle with respect to it in order that the holder when drawn through the water by a moving vessel shall assume in an upright form a position at the desired depth below the surface of the water, say from five to thirty feet, and shall thereafter so long as it is being towed remain upright at that distance below the surface and travel at that distance below it in a straight direction. This result is due to the fact that the forward portion of the upper surface of the holder acts to downwardly deflect the holder in the water until it is restricted by the pull of the tow-line, when the two forces cause it to take a horizontal course. The part of the holder-coupling which is attached to the holder is secured to it by a thin upright plate of metal $e$, forming practically part of the coupling member, and it extends into a narrow vertical recess $a^5$ in the forward end of the holder, in which it is fastened to the holder by rivets $a^6$ passing across the holder and it. The part of the plate $e$ forming the forward end of the holder acts in a way as a cut-water and a means for deflecting seaweed or other clinging material in the water from the holder. The holder has extending across it near its center a circular hole $a^7$ of different diameters opening upon each side of the holder and of a size to receive the transmitter D and its attaching means and in such a manner that the diaphragms $d\ d'$ (see Fig. 5) of the transmitter shall be flush with the sides $a\ a'$ of the holder. (See Fig. 3.) The transmitter comprises a cylindrical metal case $d^2$, having the exterior screw-threads $d^3\ d^4$ extending from each end thereof. Its end openings are closed by the diaphragms $d\ d'$. These are applied to the metal case preferably in the following manner: The diaphragms themselves are preferably made of thin brass or other metal not susceptible to the action of sea-water. Each is soldered on its inner surface along its outer edge to the outer surface of the flange $d^5$ of a holding-sleeve $d^6$, having the interior screw-thread $d^7$ and the exterior screw-thread $d^8$. The flange $d^5$ is enough within the outer face of the sleeve to form a shoulder $d^9$ for the diaphragm of the thickness of the diaphragm. The sleeve is of a size to tightly screw upon the case $d^2$, and a gasket $d^{10}$ is interposed between the sleeve-flange $d^5$ and the face of the case. It will be understood, of course, that there is a sleeve for each diaphragm, and the same reference-letters will apply to each sleeve. The case $d^2$ also has in its side a threaded hole $d^{11}$, which extends through it to the chamber $d^{15}$ between the diaphragms and there is screwed into this threaded hole $d^{11}$, a hollow shank $d^{12}$ having its outer face formed with shoulders $d^{13}$ and tapering sections $d^{14}$, extending outward from said shoulders to provide a means for receiving and holding the end of a rubber or resilient water-tight tube $h^2$. The hole $d^{16}$ in the shank is of the same diameter throughout, and through it extends the electric conducting-wire $d^{17}$, which preferably is in the form of a coil and which is surrounded by a tubular insulating and protecting envelop or case $d^{18}$. The transmitter-case $d^2$, with the diaphragm holding-sleeves $d^6$ screwed upon it, is secured against shoulders $d^{19}$ of the holder A and in position in its receiving-hole therein by means of the annular nuts $d^{20}\ d^{21}$, one upon each side of the holder, each of which has an interior screw-thread $d^{22}$ to engage the screw-thread $d^8$ of the diaphragm-sleeves. These nuts turn upon the sleeves until they bottom against the shoulders, and thus serve to clamp the case to the holder, the holder having recesses ending in these shoulders of a size to receive and hold the annular nuts when screwed home and with their outer faces flush with the sides of the holder.

Figures 5, 6, 7, 8:
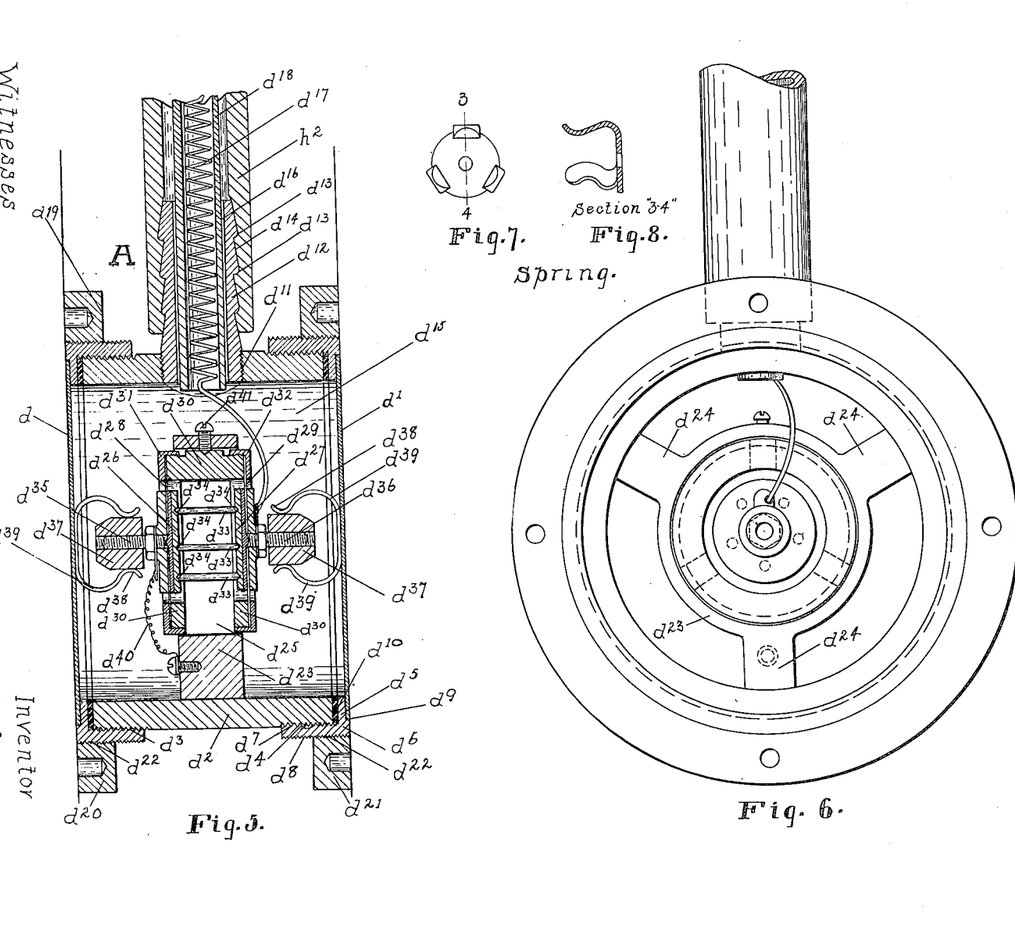

Within the chamber $d^{15}$ of the case $d^2$ is a frame $d^{23}$, (see Figs. 5 and 6,) having the arms $d^{24}$, which serve to locate it centrally in the chamber of the case. The frame is cylindrical and forms a cylindrical space $d^{25}$, within which a portion of the transmitter is contained. The transmitter represented has the electrodes, preferably of carbon, $d^{26}$ $d^{27}$, each of which is mounted on a diaphragm $d^{28}$ $d^{29}$, respectively, and these diaphragms are secured to the ring $d^{30}$ by flanged sleeves $d^{31}$ and $d^{32}$, which screw thereon. The ring $d^{30}$ is held firmly in the frame $d^{23}$ by the set-screw $d^{41}$. The electrodes are separated from each other by a space, across which extend the small rods $d^{33}$, also preferably of carbon. As many of these rods may be used as desired. I prefer that they be of the same length, that their ends be pointed, and that the electrodes have the cup-shaped or countersunk depressions $d^{34}$ for receiving and holding these pointed ends. From each electrode there extends outward the stems lettered $d^{35}$ and $d^{36}$, respectively, upon each of which there is a head $d^{37}$, adjustable lengthwise thereon, and upon which the ends $d^{38}$ of the yielding or spring arms $d^{39}$ press. These spring-arms are represented in Figs. 7 and 8, and they are attached to the inner side of the diaphragms $d$ $d'$, respectively, at or near the center thereof to extend inward, as represented in Fig. 5, and bear against the two insulating-heads $d^{37}$. Each head has a cylindrical outer surface against which the springs bear and which is of sufficient length to permit of the adjustability of the heads without varying the tension of the springs and also of the slight relative movements of the heads and springs in transmitting vibrations. The electric circuit is established through the conductor $d^{17}$, which connects to the electrode $d^{27}$ the rods $d^{33}$, the electrode $d^{26}$, and the conductor $d^{40}$, which connects the electrode $d^{26}$ with the case $d^2$. The return-circuit is provided in part by the water in which the transmitter and holder may be and in part by the return-conductor $c$ in the tow-line C. The conductor $c$ preferably is in the form of a number of small conducting-wires braided into the cylindrical covering $c'$ of the tow-line. These conductors extend, preferably, to the end of the tow-line, where it is connected with its member $f$ of the antihummer-coupling F, (see Fig. 10,) and the return-current flows from the transmitter-case through the water to this conductor. It therefore follows that a complete actuating electric circuit through the conductor $d^{17}$ to the transmitter is maintained only so long as the transmitter, holder, and antihummer are submerged in the water. When they are removed from the water, the circuit is automatically broken and remains broken until the holder and antihummer have been again submerged, as the absence of water acts to cut off or interrupt the return-circuit from the transmitter to the conductor $c$. An automatic means for establishing the circuit when the apparatus is put into the water and of closing it when it is removed from the water is of great value practically in that it does away with the necessity of instructing the user to make and break the circuit by hand at the necessary times and also prevents waste or depletion of the battery and permits of the employment of the apparatus by persons unskilled in electricity. The method described for providing this automatic opening and closing of the circuit is the best of which I now have knowledge; but I would say that I consider any other manner of accomplishing the same end to be included within the scope of my invention.

I prefer to connect the antihummer with the end of the tow-line by a two-part coupling F and with the holder A by a two-part coupling E and so that the tow-line may be both physically and electrically connected with the holder by a removable connection. I prefer that a connection in the form of an antihummer be used in order that sound-vibrations communicated to the tow-line from its motion through the water or other source may not be communicated to the holder and transmitter and also to interpose between the tow-line and the holder a yielding connection which shall relieve the tow-line and holder from the strain of an unyielding connection. I will first describe the coupling F, connecting the tow-line with the antihummer, and then the coupling E, connecting the antihummer with the holder.

Figures 10, 11, 12:
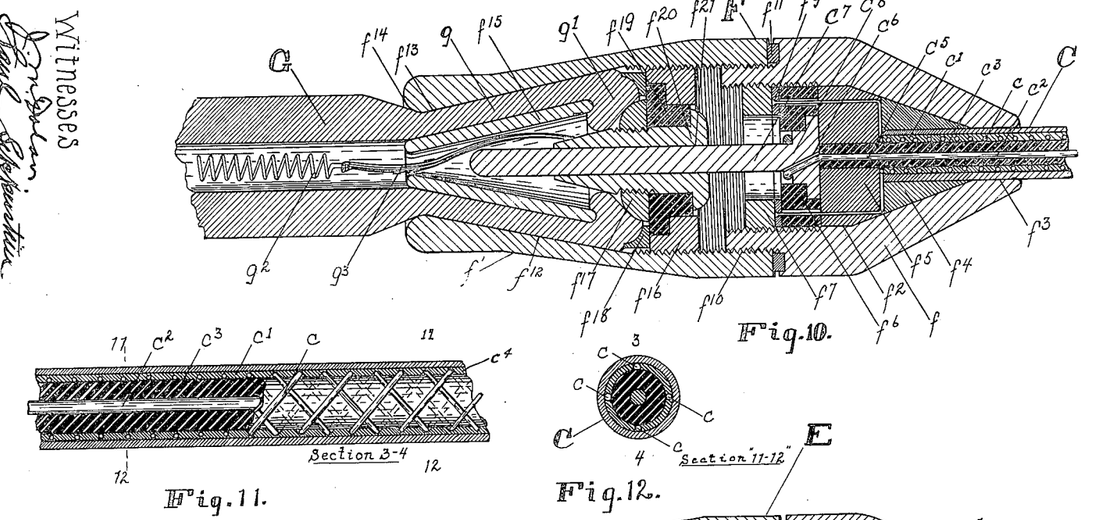
Fig. 10 is a view in longitudinal section, enlarged, of the coupling connecting the cable with the antihummer.
Fig. 11 is a view, enlarged, principally in longitudinal section of the tow-line.
Fig. 12 is a cross-section thereof upon the dotted line 11 12 of Fig. 11.

The coupling F is shown in Fig 10. The member $f$ is attached to the outer end of the tow-line C and the member $f'$ to the outer end of the antihummer B. As the tow-line C has to be of considerable length and as it is desirable that in its wound condition it should occupy as little space as possible, and as it is also desirable that it should be when in use absolutely without kinks or a disposition to kink, I have constructed it as follows, prefacing, however, with the statement that it should be borne in mind that the tow-line not only serves to tow at a considerable depth the holder, but that it also contains the two electric conductors for providing a circuit and which must be so disposed in relation to each other as to prevent kinking. I therefore have employed for providing the necessary strength one or more strands $c^2$ of piano-wire, the tensile strength of which is very great. In the drawings one strand only is shown. This is centrally arranged in the line, and it is surrounded by an insulating-covering $c^3$, (see Fig. 10,) and this in turn is covered by a braided covering $c^4$, in which the conductors $c$ answer as some of the strands of the braid, the conductors being braided with the fibrous threads as though they were fibrous threads, consequently making a braided jacket of uniform quality throughout. In order to attach the piano-wire to the coupling F, its end $c^5$ is extended beyond the braided covering $c'$ and it is passed through a hole $c^6$ in the end of a stem $c^7$ and wound around the stem to make a firm union therewith. The piano-wire $c^2$ also serves as a conductor, and it is for this reason that the coupling is provided with the stem $c^7$. It is necessary that the piano-wire $c^2$ and the stem $c^7$ should be attached to the member $f$ of the coupling in a manner to insulate them from the coupling and also in a manner to make the coupling water-tight. To accomplish this, the member $f$ has a chamber $f^2$, which is partly cylindrical and partly conical. The conical section is near the end of the coupling and has extending from it a hole $f^3$ of a size sufficient to receive the end of the tow-line which extends into the conical part of the chamber. It is there surrounded by a conical plug $f^2$, of rubber. A packing $f^5$ bears against the end of this plug $f^4$, but contains a hole of a sufficient size to permit the passage of the end $c^5$ of the piano-wire and its insulating-coating $c^3$. The enlarged end $c^8$ of the stem $c^7$ bears against the packing $f^5$ and is held firmly against it by an insulating-ring $f^6$, against which an annular nut $f^7$ screws. The conducting-wires $c$ may be brought into electrical connection with the coupling by extending them through the packing $f^5$ and the insulating-ring $f^6$ to a washer $f^9$, interposed between the nut $f^7$ and the ring, if desired, and having electric connection with the nut and coupling-shell. The member $f$ is engaged with the member $f'$ by means of its threaded section $f^{10}$, which screws into the end of the section $f'$, and a packing $f^{11}$ may be interposed between the two members. The member $f'$ of the coupling is attached to the antihummer in the following way: It is provided with a chamber $f^{12}$, which has the characteristics of the chamber $f^2$ of the other member—that is, there is a cylindrical section which ends in an inclined one and from which extends the opening $f^{13}$ through the end of the member. This opening is of considerable size and has the rounded entrance $f^{14}$. It is of a size to receive in a somewhat compressed state the end $g$ of the rubber tube G, forming the antihummer. This tube is of thick rubber resilient enough to be compressed and strong enough to tow the holder. The end of the rubber tube is drawn within the conical section of the chamber and is there expanded by a hollow conical clamp $f^{15}$, which, entering the end of the tube, expands it from the outer end of the coupling inwardly, clamps it against the inner conical surface of the coupling, and provides at its inner end an annular uncompressed end $g'$, which, lapping over the inner end of the conical clamping-plug, is clamped against the top and inner corner thereof by means of an annular nut $f^{16}$, which screws into the cavity of the coupling member, the nut $f^{17}$, and ring $f^{18}$. There is connected with the nut $f^{16}$ an insulating-ring $f^{19}$, to which is mounted a hollow contact-maker $f^{20}$, the contact-maker being secured to the insulating-ring $f^{19}$ by the nut $f^{17}$, which screws upon it. This contact-maker is centrally disposed in the coupling member and has a central hole $f^{21}$ in line with the stem $c^7$ of the other member and through which the stem extends, and it is electrically connected with the conductor $g^2$ of the antihummer. This conductor is preferably in the form of a coil of spring-wire and is connected to a short piece of flexible stranded wire $g^3$, which extends through the hole at the outer end of the conical clamping-plug and makes connection with the contact-maker $f^{20}$. It will thus be seen that the member $f'$ of the coupling is firmly secured to the end of the antihummer and in a manner to make a water-tight connection and also an electric connection with its electric conductor and that the screwing of the two members together establishes an electric connection between them, while their separation enables said electric connection to be broken.

Figure 9:
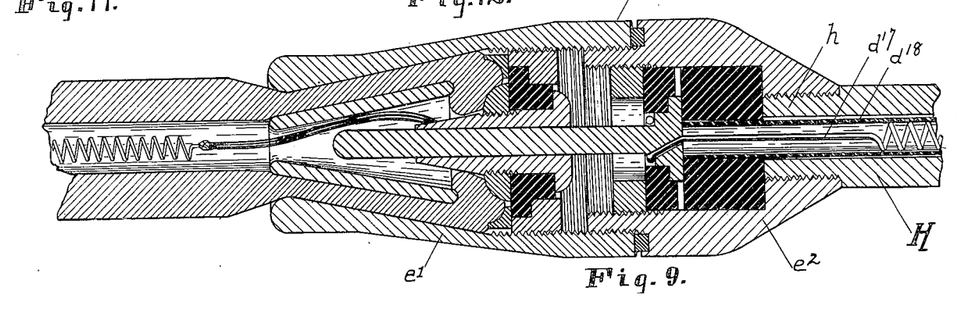
Fig. 9 is a view in longitudinal section, enlarged, of the coupling connecting the holder and transmitter with the antihummer.

The antihummer may be of any desired length, and at its outer end, or that which is connected with the transmitter-holder, it and its electric conductor are secured to the member $e'$ of the coupling E in the manner in which it is connected with the coupling member $f'$. The coupling member $e^2$ of the coupling E is in the main like the member $f$, with this modification, that its outer end is formed to screw upon the end $h$ of the tube H, which forms a portion of the waterproof covering of the electric conductor $d^{17}$, extending to the transmitter. (See Figs. 5 and 9.) The metal tube H is firmly contained in a hole $h'$, extending inward from the forward end of the holder A, but is separated from the transmitter-case by means of a short rubber tube $h^2$, contained in the cavity $h^3$ of the holder. The shank $d^{12}$ of the transmitter-case is represented as insulated from the conductor $d^{17}$ by the insulating-covering $d^{18}$, (see Fig. 5,) and the tube $h$ is insulated from the conductor $d^{17}$ by a continuation of the covering $d^{18}$.

The advantages of the invention as a whole have been stated or will be understood from the description.

While I do not confine myself to the type of transmitter shown and described, I would say that it has an advantage over one using granular carbon as a means for varying electrical resistance, in that the carbon rods or pencils avoid the trouble arising from packing and in that they are much more sensitive to faint sounds.

The enlarged chamber $h^3$ in the holder containing the tube $h^2$ may be filled with paraffin for the purpose of preventing water from entering it. As when the holder is towed through the water the rubber tube of the antihummer elongates, it is necessary that the electric conductor within it should also lengthen and should also contract with the tube, and for this reason it is made in the form of a spiral spring, which permits the elongation of the conductor to fit that of the rubber tube and also automatically contracts with the restoration of the tube to its normal length. The coil is enough less in diameter than the diameter of the bore of the tube to allow the tube to contract as it is lengthened without pressing upon the coil. The coil also does not extend into the couplings, but stops a distance from each to prevent the crushing of the coil by any short bending of the rubber tube at its juncture with either coupling, the electric conductor then assuming a direct or straight line and is then preferably made of flexible stranded wire.

The tow line or cable is of peculiar construction and embodies, as I have said first, a steel piano-wire having great tensile strength and which is also used as an electric conductor. This wire is covered by rubber insulation, over which is a braided covering, made principally of cotton, but having a number of its strands of very fine copper wires, which also form electric conductors. Over the braided covering containing the copper wires is another braided covering made entirely of cotton or linen and which acts to protect the inner covering. It is not waterproof, as I prefer that the water should penetrate to the copper wires in the interior braided covering, although this is not essential, as the circuit would be complete through the brass coupling to which the wires are attached.

Figure 1:
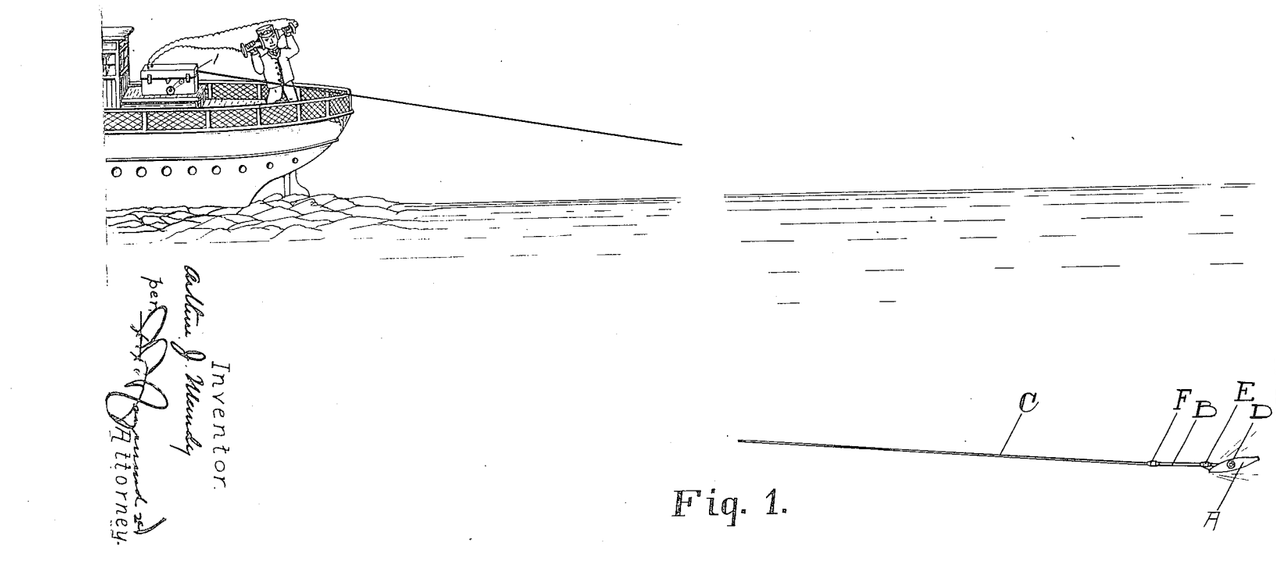
Figure 1 is a conventional view of a portion of a stern of a steamship and of the tow-line and transmitter and holder as in use.

The entire apparatus is contained when not in use in a wooden box (shown in Fig. 1) on the deck of the ship and which contains the reel, the battery, and the telephone-receivers.

The operation of the hydrophone is as follows: When a vessel is approaching a signal-station and it is desired to receive signals from it, the hydrophone-transmitter held by the tow-line is dropped into the water at the stern of the vessel and the tow-line paid out to any desired extent. Upon holding the tow-line fast the transmitter-holder will be drawn through the water at the speed of the vessel. The first effect of checking the tow-line will be to cause the holder to be diverted downward in the water by the deflecting means upon it acting against the water and causing it to take such direction. The weight upon the holder will steady it and cause it to assume an upright position in the water. This deflecting movement will continue until it is balanced by the draft of the tow-line, which exerts an upward moving force upon the holder, and the holder from that time will be caused to take a straight path in the water following the vessel and at its speed and at substantially a uniform distance below the surface of the water, largely regulated by the degree of the angle of the deflecting means. The hydrophone-transmitter is by the act of placing it in the water electrically connected with the battery which is on the vessel and with the receiver on the vessel, and this connection is entirely automatic, requiring no action upon the part of the user of the instrument. The hydrophone is then in condition for use in taking the sound-signals conducted by the water to it and for transmitting them electrically to the receiver and for delivering them by the receiver as audible sounds to the hearer on the vessel, and as it is insulated from the sounds of the vessel it may be used while the sounds continue upon the vessel and while it is moving at any rate of speed.

One effect of the invention is to place submerged in the water in an upright position and so that it may be drawn through the water and be active while so drawn a sound-transmitter, which shall receive sound impulses conducted to it by the water at a point sufficiently remote from the vessel to which it is attached to receive sound-signals independently of the noises or sounds produced by the vessel itself, and so far as I am aware this is the first submarine sound-transmitting device which is adapted to be so used. The sound-vibrations which the water conducts are received by the diaphragms of the hydrophone-transmitter exposed to it, converted by the electrical transmitter which they actuate into electrical impulses, which are communicated by the electrical connection carried by the cable with the hydrophone-receiver upon the vessel and which is in the form of a telephone receiving instrument, the electric circuit between the vessel and the hydrophone-transmitter which I have shown being by means of a wire forming the principal part of the tow-line connecting the battery directly with the transmitter and a return-conductor connecting the transmitter with the receiver, which comprises in part that part of the water in which the transmitter is submerged between it and a portion of the tow-line and the electric conductors in the tow-line insulated from the draft-wire, to which I have referred. When the hydrophone is no longer required, it is drawn back by the tow-line to the vessel, and upon being lifted from the water its electric circuit is immediately broken automatically without conscious action for that purpose by the user, and it remains broken so long as the hydrophone-transmitter is out of the water, whatever its position may then be. This insures that the battery shall be active only while the hydrophone is in use and is a guarantee that the battery shall not become exhausted by accident and need replenishing at the time when the hydrophone is required for use.

The construction of the hydrophone-transmitter is such that it is not liable to injury by rough usage in the water or on shore, that it may be readily detached from the tow-line, and that the transmitter itself may be easily removed from the holder. The antihummer is also shown as easily detached from the holder and also from the tow-line, and the operation of detaching the holder from the antihummer and the antihummer from the tow-line and also the operation of attaching the holder to the antihummer and the antihummer to the tow-line automatically makes or breaks the electric connection between the holder, antihummer, and tow-line.

I do not claim the specific construction of the couplings for connecting the holder with the antihummer and the antihummer with the tow-line, physically and electrically, as they will be made the subject of a separate application by other inventors.

While the hydrophone may be used in conjunction with any kind of a vessel, whether sailing or steam or whether it is moving or not, I have designed it especially for use in conjunction with vessels which move at very considerable or even rapid speed through the water and so that it will be operative under such conditions of use, and this I deem to be one of the principal advantages of the invention.

It is not necessary to always use a holder having the deflector and the weight, for in some instances the weight only may be used and in others the deflector alone. It is desirable, however, that the holder should be so constructed as not to turn or twist on the tow-line as it is being drawn through the water.

It will be understood that when an electrical transmitter is employed the vibrations of the sound impulses are received by it and converted into corresponding electric current or impulses which are converted back into sounds by the receiver in the usual manner of an electrical telephone-receiver.

Having thus fully described my invention, I claim and desire to secure by Letters Patent of the United States—

1. A hydrophone-transmitter adapted to be towed in water and means acting by the contact of the water therewith to maintain the transmitter submerged while it is being towed.

2. An electrical hydrophone-transmitter adapted to receive sound-vibrations imparted to water, means for towing it and means acting by the contact of the water therewith to maintain the transmitter submerged while it is being towed.

3. An electrical hydrophone-transmitter adapted to receive and transmit sound-signals imparted to water, means for towing it in the water and means acting by the contact of the water therewith to maintain the transmitter submerged while it is being towed, and an electric connection between it and a towing vessel.

4. An electrical sound-transmitting device for receiving and transmitting submarine signals comprising an electrical hydrophone-transmitter and a holder for the transmitter having a body decreasing in height and thickness toward one end.

5. An electrical sound-transmitting device for receiving and transmitting submarine signals comprising an electrical transmitter and a holder for the transmitter having a relatively long, thin body.

6. An electrical sound-transmitting device for receiving and transmitting submarine signals comprising an electrical transmitter and a holder for the transmitter having a body decreasing in height and thickness at both ends.

7. An electrical sound-transmitting device for receiving and transmitting submarine signals comprising an electrical transmitter, a holder for the transmitter having a body decreasing in height and thickness at its forward end, and means at its forward end for connecting it with a tow-line or cable.

8. An electrical sound-transmitting device for receiving and transmitting submarine signals comprising an electrical transmitter, a holder for the transmitter decreasing in height toward its forward end, and means above its forward end for attaching it to a tow-line or cable.

9. An electrical sound-transmitting device for receiving and transmitting submarine signals comprising an electrical transmitter and a holder for the transmitter provided with means for deflecting it diagonally downward in the water when the holder is in motion therein.

10. An electrical sound-transmitting device for receiving and transmitting submarine signals comprising an electrical transmitter and a holder for the transmitter having means for maintaining it upright in the water and also means for causing it to be deflected by the water when moved through it.

11. An electrical sound-transmitting device for receiving and transmitting submarine signals comprising an electrical transmitter provided with two diaphragms, oppositely arranged, a holder for the transmitter having a body, and a hole extending transversely its body from side to side for containing the transmitter.

12. An electrical sound-transmitting device for receiving and transmitting submarine signals comprising an electrical transmitter having sound-receiving diaphragms, oppositely arranged, and a holder for the transmitter extending from it in the shape of a relatively long body decreasing in height toward its forward end.

13. An electrical sound-transmitting device comprising an electrical transmitter, a holder for the transmitter having a relatively long body weighted upon its under side and connected at its forward end with a tow-line or cable, and an electric connection extending from the tow-line or cable through the holder to the transmitter.

14. An electrical sound-transmitting device comprising an electrical transmitter, a holder for the transmitter surrounding its case and extending forward and backward therefrom, having at its forward end a cutwater, a coupling and an electric connection extending from the coupling and transmitter, the said holder also having a deflecting means.

15. An electrical sound-transmitting device for receiving and transmitting submarine signals comprising an electrical transmitter, a holder for the transmitter, a tow-line or cable and a vibration-insulator between the transmitter and tow-line or cable.

16. An electrical sound-transmitting device for receiving and transmitting submarine signals comprising a holder, a cable or tow-line attached to the holder, a vibration-insulator in the cable or tow-line, and an electrical transmitter carried by the holder.

17. An electrical sound-transmitting device for receiving and transmitting submarine signals comprising a holder, an electrical transmitter mounted in the holder, and a tow-line or cable, a section of which near the holder is longitudinally extensible.

18. An electrical sound-transmitting device for receiving and transmitting submarine signals comprising an electrical transmitter, a holder for the transmitter, and a towing cable or line connected with the holder, a section of which near the holder is longitudinally extensible and vibration-insulating.

19. An electrical sound-transmitting device for receiving and transmitting submarine signals comprising an electrical transmitter, a holder for the transmitter, a cable or tow-line, a section of which near the holder is flexible and extensible, and an electric conductor carried by the cable or tow-line, a section of which within the extensible part of the cable is likewise extensible.

20. An electrical sound-transmitting device for receiving and transmitting submarine signals comprising an electrical transmitter, a holder for the transmitter, a cable or tow-line connected with the holder, a section of which near the holder is longitudinally extensible and flexible, and an electric conductor carried by the tow-line or cable, a section of which in the extensible part of the tow-line or cable is in the form of a coil and sections of which where it enters and leaves the extensible part of the cable are not coiled but flexible.

21. An electrical sound-transmitting device for receiving and transmitting submarine signals comprising an electrical transmitter, a holder for the transmitter, a tow-line or cable comprising an extensible sound-insulator in the form of a rubber tube near the holder, an electric conductor contained within the tube, and one or more strands of wire connected with the tube and with the electric conductor thereof, forming the principal means of draft and also an electric conductor.

22. An electrical sound-transmitting device for receiving and transmitting submarine signals comprising an electrical transmitter, a holder for the transmitter, an antihummer forming a part of a tow-line or cable, connected with the holder, and a coupling between the antihummer and remainder of the tow-line or cable.

23. An electrical sound-transmitting device for receiving and transmitting submarine signals comprising an electrical transmitter, a holder for the transmitter, an antihummer, an electric conductor in the antihummer, and a coupling for connecting the holder with the antihummer and the electric conductors of both.

24. An electrical sound-transmitting device for receiving and transmitting submarine signals comprising an electrical transmitter, a holder for the transmitter, an antihummer having an electric conductor connected with the transmitter, a tow-line or cable, of which the antihummer is a part, having an electric conductor, and a coupling connecting the tow-line with the antihummer and the electric conductors of both.

25. An electrical sound-transmitting device for receiving and transmitting submarine signals comprising an electrical transmitter, a holder for the transmitter, a tow-line or cable connected with the holder and forming a part of an electric circuit to the transmitter, means whereby the submersion of the holder automatically closes the circuit.

26. An electrical sound-transmitting device for receiving and transmitting submarine signals comprising an electrical transmitter, a holder for the transmitter, a tow-line or cable connected with the holder and forming a part of an electric circuit to the transmitter, means whereby the removal of the holder from the water acts to automatically break the circuit.

27. An electrical sound-transmitting device for receiving and transmitting submarine signals comprising an electrical transmitter, a holder for the transmitter, a tow-line or cable connected with the holder and forming a part of an electric circuit to the transmitter, means whereby the submersion and removal of the holder from the water acts to automatically make and break the circuit.

28. An electrical sound-transmitting device for receiving and transmitting submarine signals comprising an electrical transmitter, a holder for the transmitter, a tow-line or cable having an electric conductor extending to and connected with the transmitter, and an electric conductor terminating short of the transmitter.

29. An electrical sound-transmitting device for receiving and transmitting submarine signals comprising an electrical transmitter, a holder for the transmitter, a tow-line or cable therefor comprising an antihummer and a single electric conductor, and a main tow-line or cable comprising an electric conductor connected with the conductor of the antihummer and an electric conductor ending near the antihummer.

30. An electrical sound-transmitting device comprising an electrical transmitter, means for towing the same through the water, means for maintaining the transmitter upright, and means for maintaining the transmitter submerged at a constant depth, while being towed, said means acting by the contact of the water therewith.

31. An electrical sound-transmitting device for receiving and transmitting submarine signals comprising an electrical transmitter, a holder, and a cable or tow-line having means for electrically connecting the transmitter with a towing vessel, the said holder being constructed to automatically assume and maintain while being towed a given depth from the surface of the water by reason of the contact of the water therewith.

32. An electrical sound-transmitting device for receiving and transmitting submarine signals comprising an electrical transmitter, a holder, and a cable or tow-line having means for electrically connecting the transmitter with a towing vessel, the said holder being constructed to automatically assume and maintain while being towed a given depth from the surface of the water and also an upright position therein by reason of the contact of the water therewith.

33. An electrical sound-transmitting device for receiving and transmitting submarine signals comprising an electrical transmitter, a holder, and a cable or tow-line having means for electrically connecting the transmitter with a towing vessel, consisting of two conductors, one of which is connected with the transmitter and the other terminating short of it.

34. A hydrophone, the same comprising a submergible holder adapted to be moved through the water, having a sound-transmitter and means acting by the contact of the water therewith for maintaining the holder in operative position below the surface of the water while it is being moved, and an electric sound-receiver electrically connected with the sound-transmitter.

35. A hydrophone, the same comprising a submergible holder, adapted to be moved through the water, having a sound-transmitter and means acting by the contact of the water therewith for maintaining the holder in upright position below the surface of the water while it is being moved, an electric sound-receiver, and a tow-line for towing the holder and electrically connecting the sound-receiver and battery with the sound-transmitter.

36. A hydrophone, the same comprising a submergible holder, adapted to be moved through the water, having a sound-transmitter and means for maintaining it in operative position below the surface of the water while it is being moved, an electric sound-receiver and a tow-line for towing the holder and electrically connecting the sound-receiver with the sound-transmitter, a section of which is yielding.

37. In a hydrophone, a submergible holder, adapted to be towed through the water, having a sound-transmitter and means acting by the contact of the water therewith for maintaining the holder in upright position below the surface of the water while it is being moved.

38. In a hydrophone, a submergible holder, adapted to be towed through the water, having a sound-transmitter and means acting by the contact of the water therewith for maintaining the holder in upright position below the surface of the water while it is being moved, and a sound-conductor for conducting sound impulses received by the transmitter to a receiving-point.

39. A transmitter comprising a cylindrical, metal case open at both ends, sleeves to screw upon said case, diaphragms soldered by their edges to the sleeves, electrodes within the chamber of the case connected with the diaphragms, means for varying electrical resistance between the electrodes, and the electric conductors.

40. The holder having a transverse hole and a transmitter contained in said hole having a case and clamping-nuts to clamp the case to the holder.

41. An electrical sound-transmitting device for receiving and transmitting submarine signals comprising an electrical transmitter, a holder for the transmitter, an antihummer forming a part of a tow-line or cable, and a coupling between the antihummer and the holder.

42. A sound-transmitter and means acting by the contact of the water therewith for holding the transmitter upright and submerged in the water while it is in motion.

43. A hydrophone adapted to hold itself submerged by the action of the water in contact therewith and to be connected with a moving vessel to occupy a position in the water behind it.

44. A hydrophone adapted to be moved through the water in a submerged position and to carry its sound-transmitter equally exposed to sound-vibrations coming from either side thereof.

45. A hydrophone having its sound-transmitter provided with one or more diaphragms which are vertically disposed with respect to the plane of movement of the hydrophone in the water.

46. A hydrophone adapted to be held submerged by the action of the water in contact therewith while it is being moved therein and means for moving it comprising a tow-line extending from a moving vessel or object and connected with the hydrophone.

47. A hydrophone comprising a holder adapted to hold itself submerged in the water while moving through it, an electric sound-transmitter carried by the holder and means for detachably securing it to the end of a tow-line.

48. A hydrophone having an electric sound-transmitter adapted to hold itself submerged by the action of the water in contact therewith while it is being towed, means for electrically connecting the transmitter with a towing vessel, and a circuit-maker.

49. A hydrophone having an electric sound-transmitter and adapted to hold itself submerged by the action of the water in contact therewith while it is being towed, means for electrically connecting the transmitter with a towing vessel, and a circuit-breaker.

50. A hydrophone adapted to be towed by a vessel and held submerged by the action of the water in contact therewith while it is being towed and electrically connected with a vessel while it is moving through the water.

51. A hydrophone adapted to be towed by a vessel and to be maintained submerged by the action of the water in contact therewith and having one or more electrodes vertically disposed with respect to the plane of its movement.

ARTHUR J. MUNDY.

Witnesses:
F. F. RAYMOND, 2d,
J. M. DOLAN.